United States Patent [19]
Tamura

[11] Patent Number: 5,402,531
[45] Date of Patent: Mar. 28, 1995

[54] METHOD FOR PRODUCING OFFSET SURFACE AND OFFSET SOLID

[75] Inventor: Hideki Tamura, Yokohama, Japan

[73] Assignee: Ricoh Company, Ltd., Tokyo, Japan

[21] Appl. No.: 931,476

[22] Filed: Aug. 19, 1992

[30] Foreign Application Priority Data

Aug. 20, 1991 [JP]   Japan ................................ 3-234091

[51] Int. Cl.$^6$ ............................................. G06F 15/62
[52] U.S. Cl. ......................................................... 395/120
[58] Field of Search ............... 395/120, 119, 139, 141; 364/474.29

[56] References Cited

U.S. PATENT DOCUMENTS

| | | | |
|---|---|---|---|
| 4,569,014 | 2/1986 | Kishi et al. ......................... | 364/191 |
| 4,785,399 | 11/1988 | Evans et al. ......................... | 395/156 |
| 4,791,583 | 12/1988 | Colburn ............................... | 395/120 |

FOREIGN PATENT DOCUMENTS 2-51779  2/1990  Japan .

OTHER PUBLICATIONS

R. T. Farouki, "Exact Offset Procedures For Simple Solids," *Computer aided Geometric Design 2*, Apr. 1985, 257-279.

W. Tiller and E. G. Hanson, "Offsets of Two-Dimensionals Profiles," *IEEE CG&A*, Jul. 1984, pp. 36-46.

*Primary Examiner*—H. R. Herndon
*Assistant Examiner*—Michael S. Smith
*Attorney, Agent, or Firm*—Popham, Haik, Schnobrich & Kaufman, Ltd.

[57] ABSTRACT

A connection condition between two adjacent original surfaces, selected from a plurality of connected original surfaces, is determined as to whether it is smooth, concave, or convex. Then, each of the original surfaces is offset at a predetermined distance along unit vectors normal to the original surface, to obtain an offset surface. Also, an original loop for each of the original surfaces is offset at the predetermined distance along unit vectors normal to the original surface at its edges to obtain an offset loop. Then, a new surface between two adjacent offset loops is interpolated when the connection condition is convex. A self-interference portion is removed when the connection condition is concave, so as to obtain a plurality of offset surfaces based on the plurality of original surfaces.

16 Claims, 7 Drawing Sheets

NG LOOP

OFFSET SURFACES

ORIGINAL SOLID

OFFSET SURFACE

ORIGINAL SOLID

SUPPLEMENTED OFFSET SURFACE

ORIGINAL SOLID

NG LOOP

Fig. 10a
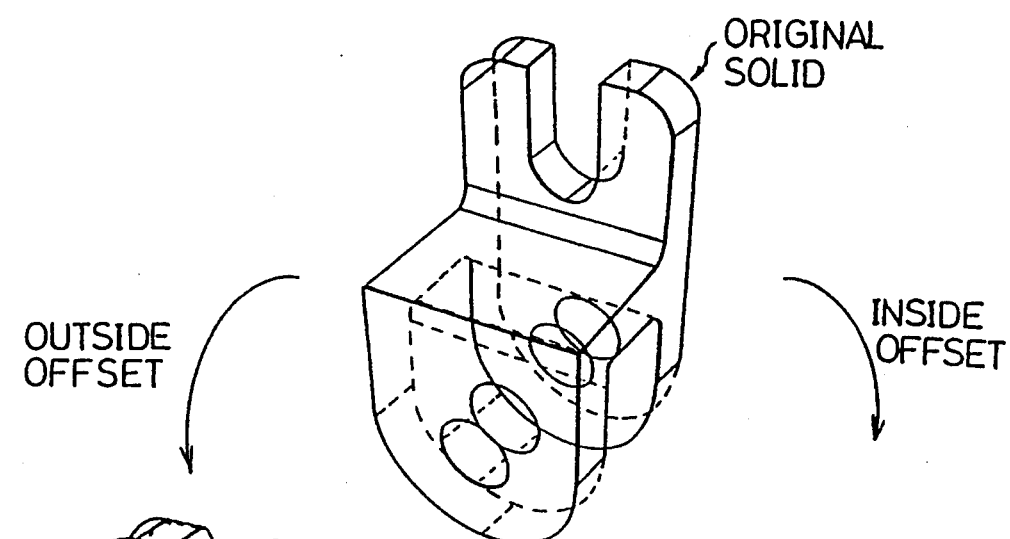
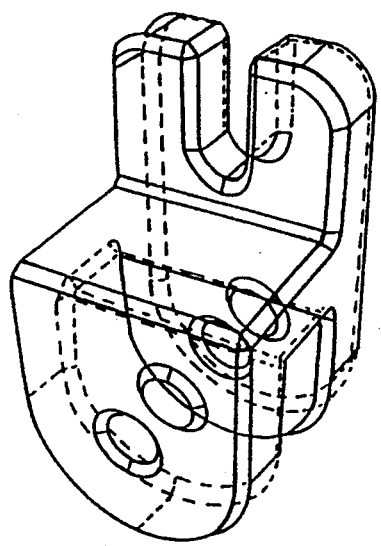
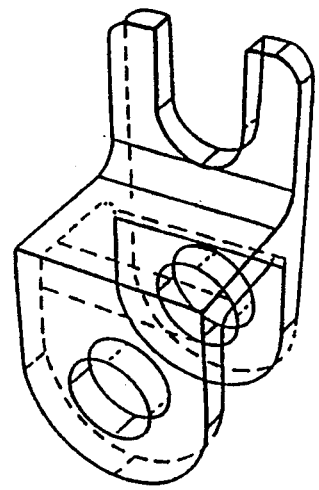
Fig. 10b
Fig. 10c

METHOD FOR PRODUCING OFFSET SURFACE AND OFFSET SOLID

BACKGROUND OF THE INVENTION

1. Field of the Invention

The present invention relates to a method for producing offset surfaces and offset solids. More particularly, the invention relates to an offset curved surface production method and an offset solid production method in data production of three-dimensional data processing apparatus. The method may be applied-for example to a solid producing apparatus for defining a complex solid.

2. Description of the Related Art

A recent trend is execution of structural analysis or of machining based on data through a definition of three-dimensional solid using the three dimensional CAD system on a computer. A high performance data defining capability is required for the three-dimensional CAD system to support it. There are diverse input methods expected.

The three-dimensional CAD system handles various input data. Generally, the most frequent chance of input is a solid with an identical sectional thickness. An offset solid production method is very effective to input such a solid. Most of three dimensional CAD's lack this function, so that the process is usually ended either with only formation of outer form or with rough formation of inner form.

This is because it is too difficult to make an offset solid by combining offset surfaces for respective surfaces. Japanese Unexamined Patent Publication No. 2-51779 describes an "offset curve production method", by which only a curve can be offset. R. T. Farouki, "Exact offset procedures for simple solids," Computer Aided Geometric Design 2, pages 257–279, 1985, concerns a method for producing an offset solid to a simple solid such as cylinder, cone, etc. using its properties, and also teaches the difficulties of process for more complex solid.

SUMMARY OF THE INVENTION

It is an object of the present invention, taking the above circumstances into consideration, to provide a method for producing offset surfaces and offset solids, which can produce not only a simple solid data like a cylinder or a cone, but also an offset solid to a solid including free form surfaces, and which may be applied to the CAD system obtaining an effective data input environment.

The above object of the present invention may be achieved by a method for producing an offset surface to an original object having a plurality of loop-segmented surfaces, comprising: judging a connection condition between respective two adjacent surfaces of the original object; forming an offset surface for each surface of the original object; connecting the offset surfaces obtained based on the judgment of connection condition; and supplementing a plane if there is a loop lacking geometry information among the offset surfaces.

The offset surface production method of the present invention is a general production method independent of original object. An offset surface may be readily produced by the method of the present invention even to a complex solid.

In the above method, the judgement may be conducted about whether the connection condition is smooth, concave, or convex.

If the connection condition is smooth, two offset surfaces may be connected in a smooth manner.

If the connection condition is convex, a gap is interpolated with a surface between two offset surfaces.

If the connection condition is concave, an interference is removed between two offset surfaces.

Further, the judgement may be conducted either on a edge between two adjacent surfaces or on surfaces near a edge between two adjacent surfaces.

The offset surface formation may be conducted in the curve fitting technique.

Information of superposition of loops is shared upon the offset surface formation.

The method of the present invention may be applied to a method for producing an offset solid to an original solid.

The method of the present invention may also be applied to a method for producing an offset surface set to a part of surface set on an original solid.

This application allows a production of large offset surface comprising many offset surfaces not to the entire solid, but to a part of region on a solid. This is because an offset solid is considered as an assembly of offset loops to constituent loops on a solid. A large offset surface comprising many offset surfaces produced by this invention is very significant for machining systems. Because a tool for machining moves on such an offset surface. In other words, a cutter path for machining may be produced using an offset surface produced in the above application.

The method of the present invention may be applied to an offset solid production method, which further comprises a step of inverting an offset solid and a step of connecting the inverted offset solid with an original solid to form a hollow object with a predetermined thickness.

According to this application, a solid may be easily produced with a predetermined thickness. Thus a hollowed object may readily be produced.

Applying the method of the present invention to a three-dimensional solid modeler, a great progress may be achieved in production capability of solid data in the solid modeler.

Further objects and advantages of the present invention will be apparent from the following description of the preferred embodiments of the invention as illustrated in the accompanying drawings.

BRIEF DESCRIPTION OF THE DRAWINGS

FIGS. 5a–5c are drawings to show connection conditions of planes, in which FIG. 5a shows a smooth connection condition, FIG. 5b a concave connection condition, and FIG. 5c a convex connection condition;

FIGS. 10a–10c are drawings to show examples of offset solid production, in which FIG. 10a shows an original solid, FIG. 10b an outside offset, and FIG. 10c an inside offset;

DESCRIPTION OF THE PREFERRED EMBODIMENTS

There are preferred embodiments of the present invention explained in the following with reference to the accompanying drawings:

The following technological methods are employed in the present invention.

i) Method for removing a self interference portion of solid;
ii) Method for connecting two loops;
iii) Method for producing a surface in a boundary given;
iv) Method for producing a curve from a series of points given and vectors at the respective points.

First explained is an offset surface, which is a fundamental unit for producing an offset solid. A given surface S is expressed in the following parametric representation:

$$r = r(u,v).$$

A unit normal vector n may be represented by the following equation at a point r on the surface S, using partial derivative vectors $r_u = \partial r/\partial u$, $r_v = \partial r/\partial v$ in the u- and v-directions, respectively.

$$n(u, v) = \frac{r_u \times r_v}{|r_u \times r_v|}$$

Then an offset surface $S_0$ may be expressed as follows:

$$r_0(u,v) = r(u,v) + dn(u,v),$$

where d is an offset distance.

Figure 1:
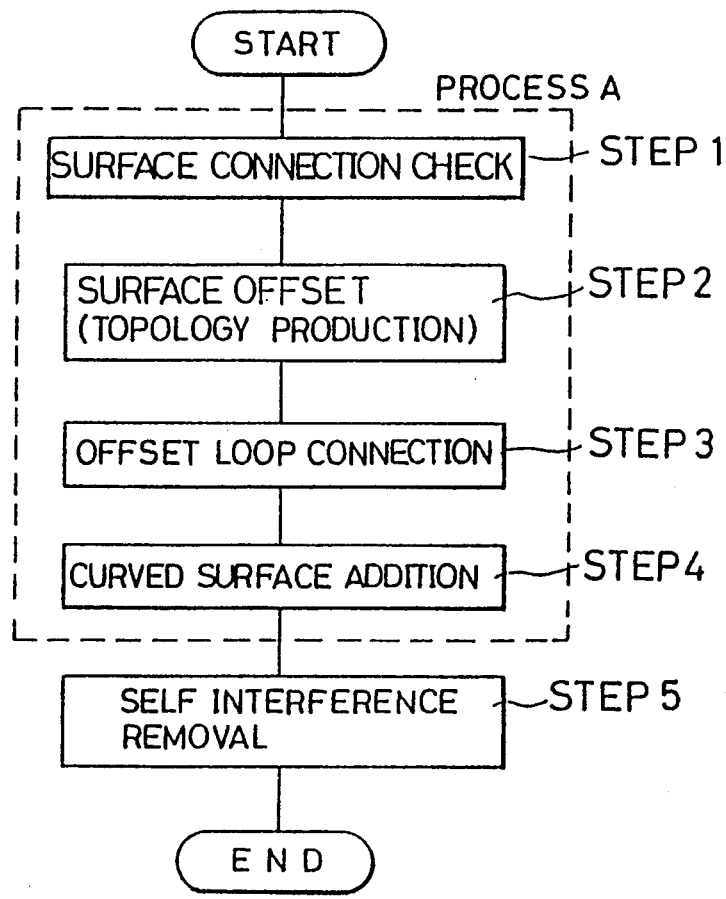
FIG. 1 is a flowchart to illustrate an embodiment of an offset solid production method according to the present invention.

FIG. 1 is a flowchart to illustrate an embodiment of an offset solid production method according to the present invention. The first embodiment is explained with steps.

Step 1: Check of connection between surfaces.
Step 2: Production of offset surfaces with topology.
Step 3: Connection between offset surfaces.
Step 4: Removal of NG loop, where a loop is an element representing a boundary of surface.
Step 5: Removal of self interference portion.

The NG loop in Step 4 means a Non Geometry loop, which contains topology information, but lacks geometry information. A loop with geometry information is called a G loop to discriminate from the NG loop.

Figure 4:
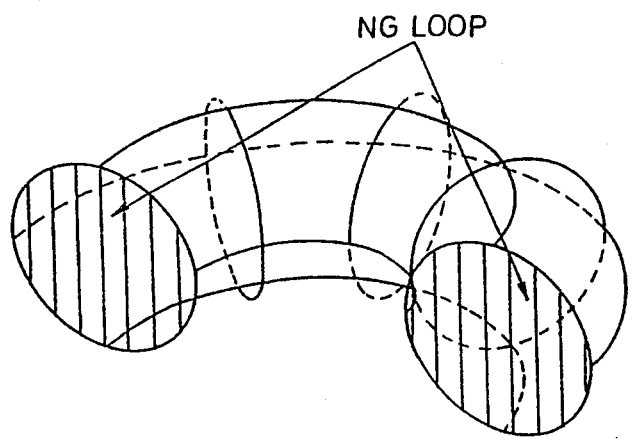
FIG. 4 is a drawing to exemplify an NG loop.

The NG loop does not always stand for a loop which cannot produce a surface. A loop which can produce a surface could be an NG loop. FIG. 4 shows an example of NG loop, in which surfaces of hatched portions are NG loops. In this example, the solid should be normally stuffed inside, but actually has hollowed data inside because of the NG loops on the both ends.

The respective steps are explained in the following.

Step 1: Check of connection between surfaces

An offset solid is a solid which is produced by combining offset surfaces for all surfaces of an original solid. However, since there may actually be a gap among offset surfaces, additional al surfaces would be required among the surfaces. In contrast, there may be a case requiring removal of interference portion among some offset surfaces.

Figures 5A, 5B, 5C:
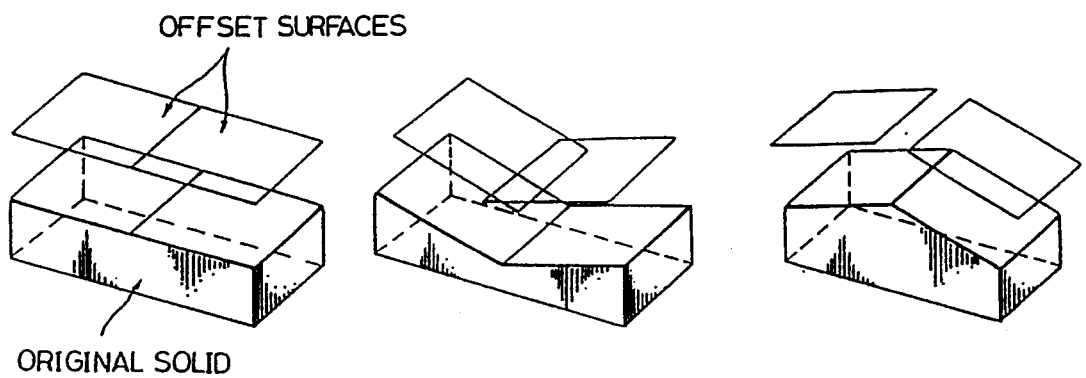

The necessity of addition of surface or of removal of interference portion is determined by checking connection conditions between surfaces of original solid. If two planes of an original solid are connected in a smooth manner, the offset surfaces are also connected in a smooth manner. Otherwise, there occurs a gap or an interference between two offset surfaces. FIGS. 5a–5c show three typical connection conditions between two surfaces. FIG. 5a shows a smooth connection condition, FIG. 5b a concave connection condition producing the interference, and FIG. 5c a convex connection condition producing the gap.

Preliminary check of connection condition between surfaces is considered to be very important for efficient production of offset solid. The following methods are employed to judge whether a connection condition is "smooth", "concave", or "convex" between two surfaces.

1) Check on a edge

Figure 6:
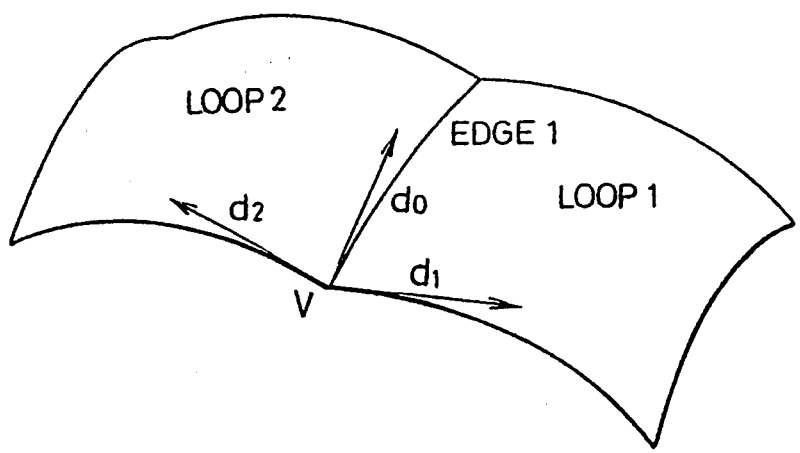
FIG. 6 is a drawing to show a check of the connection condition on a edge between two surfaces.

The check of connection between surfaces is nothing but a check near a edge between two surfaces. The check is typically carried out near both end vertices. of a edge between two surfaces, using tangent vectors of edges. For example, from tangent vectors (d0, d1, d2) of edges joint at vertex V as shown in FIG. 6, vector products (d0×d2, d1×d0) are obtained to judge a connection condition from an angle between the thus-obtained vectors d0×d2 and d1×d0. If the angle is zero, then the connection condition is "smooth". If the angle is not zero and the vector d0×d2 is rotated anti-clockwise to the vector d1×d0 in the plane defined by the vectors d0×d2 and d1×d0 seen from the side of the tangent vector d0, then the connection condition is "concave". If the vector d0×d2 is rotated clockwise to the vector d1×d0 in the plane, then the connection condition is "convex". 2) Check on a surface A normal vector is obtained on a surface in a portion of edge to actually be checked. Then, the judgement of connection condition may be conducted by checking an angle between the normal vectors obtained.

The check of connection condition is normally carried out on a edge, but it cannot be effective in case of tangent vectors of edges aligned on a straight line. In such a case, the check on a surface is conducted. A high cost calculation is necessary for obtaining the normal vector at a point on a surface by a computer. Therefore, it is very effective in process time to check most of connection conditions between surfaces on edges.

Figures 7A, 7B:
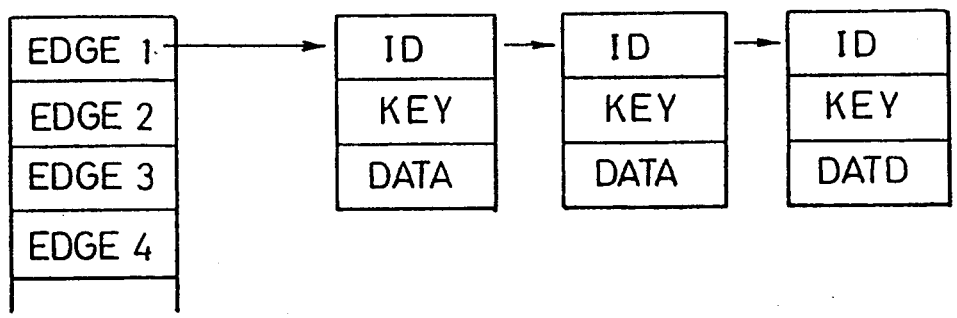
FIGS. 7a and 7b are drawings to show an example of storage of attribute information on edges.

Judgement results are stored as attribute information of respective edges of original solid in a storage device. FIGS. 7a and 7b show states of storage of the attribute information. FIG. 7a shows a edge table, and FIG. 7b does attribute information. There are stored data with identification (ID) to show that the stored data are judgement results of connection condition between surfaces and with KEY to show that each judgement result belongs to which portion of edge between surfaces. FIG. 7b shows that the connection condition of edge 1 has been checked at three points providing three set of the data.

Step 2: Production of offset surface with topology

In the solid modeling system, a solid cannot be produced only with surface information. It always requires topology information, too. Producing an offset surface with topology corresponds to producing a solid composed of a sheet of curved surface. A procedure thereof is as follows.

1) Production of boundary curves for offset surface

Topology information for offset surface is produced based on information about edges of the original loop boundary curve. The curve fitting technique is employed for production of topology information. This technique is a method for producing a curve from points, through which the curve should pass, and from direction vectors at the respective points. Several points are taken on a edge constituting an original loop, and offset points are obtained to the original points in the normal direction to the surface. A boundary curves of offset surface is obtained from the thus-obtained offset points and vectors at the respective points.

It is usual that a loop shares a edge with an adjacent loop. If an offset loop has already been produced to the adjacent loop, the shared edge must have been used to obtain a boundary curve of offset surface to the adjacent loop. Further, if the loops on the both sides of the edge are connected in a "smooth" manner upon check of connection between surfaces in Step 1, an offset curve to the shared edge may be used as a boundary curve of offset surface to the outstanding loop, because the offset curves should be identical in the connection condition. Thus in such a case the first obtained curve is again used without duplication of calculation. The operation to obtain an offset curve of boundary is actually very costly in calculation. Therefore, reduction in duplication of calculation contributes to high speed processing.

2) Production of topology from boundary curves

Topology information is produced from boundary curves produced in Step 2-1). In this occasion, two offset loops are produced. Information about edges, which constitute boundaries of the thus-produced offset loops, has been produced in Step 2-1). The information about edges could be again used as explained in Step 2-1). Thus the information about edges of offset loops is stored in the storage device as attribute information of edges of original loops for easy reference to the information. This facilitates effective reference to the information in Step 2-1). A way of storage is the same as the storage method of connection conditions between surfaces in Step 1.

3) Addition of offset surfaces

Information of offset surfaces produced in Step 2-2) is added. There are two offset loops produced in Step 2-2). The information is added to one of the thus-produced offset loops, which has the same direction as the original loop. The other loop is made as an NG loop.

According to the above operations in Steps 2-1) to 2-3), offset surfaces (offset loops) are produced to respective surfaces (loops) of the original solid.

Step 3: Connection of offset surfaces (loops)

The offset loops produced in Step 2 are independent of each other. The independent offset loops are connected to produce an offset solid. The connection of offset loops is carried out based on the judgement results in Step 1. Detailed processes are as follows.

1) In case of "smooth" connection

Two adjacent offset loops are connected as they are, because they are coincidentally connected at their joint. The connection is carried out among the NG loops behind the offset loops. As a result, the NG loops are turned into a large NG loop.

2) In case of "concave" connection

Two adjacent offset loops interfere with each other. Nothing is done at this stage in this case.

3) In case of "convex" connection

Figure 8A:
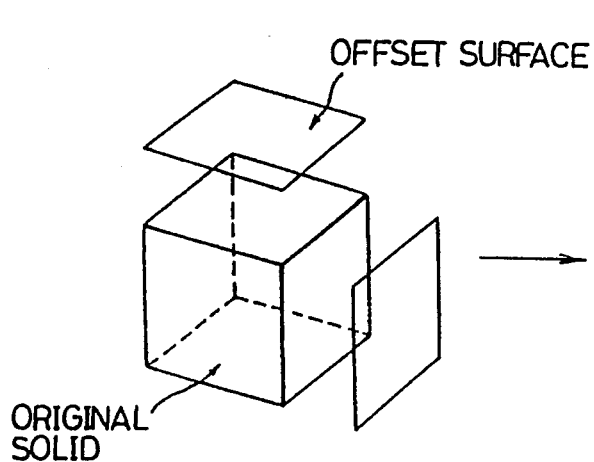
FIGS. 8a and 8b are drawings to show an interpolation between two offset surfaces.
Figure 8B:
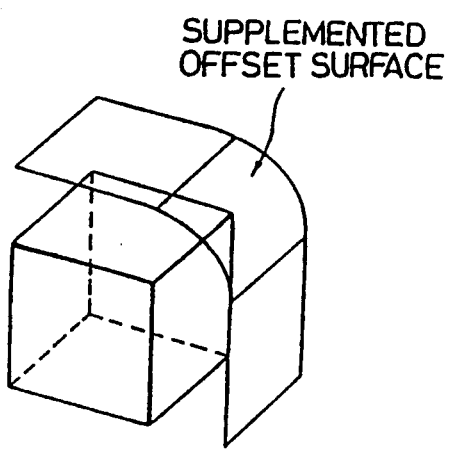

Two adjacent offset loops are apart from each other. A new surface is produced in the apart portion for interpolation and connection. FIGS. 8a and 8b show the process of such interpolation. FIG. 8a shows a state before the interpolation, and FIG. 8b a state after the interpolation. After the interpolation, the NG loop becomes only a large loop as is the case in the "smooth" connection.

Step 4: Removal of NG loops

Figure 9:
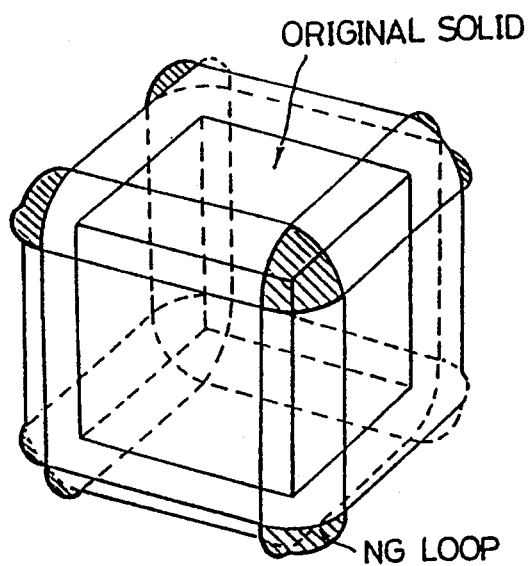
FIG. 9 is a drawing to show an addition of curved surface.

After the process of Step 3, the data obtained is considerably close to an offset solid finally to be obtained. There are, however, new gaps made after the interpolation between offset loops. There remain NG loops in the new gaps. If a surface can be extended in a gap, an NG loop may be converted into a G loop by adding data of surface. Loops of bold solid line (hatched portions) remain as NG loop in FIG. 9. Information of surface (sphere surface in this case) is added to the NG loops for conversion into the G loops.

Step 5: Removal of self interference portions

Self interference portions are finally removed. A self interference occurs in a portion judged as "concave" connection in Step 1.

FIGS. 10a–10c are drawings to show examples of solid production using the offset solid production method according to the present invention. FIG. 10a shows an original solid, FIG. 10b an outside offset solid, and FIG. 10c an inside offset solid.

They are examples of offset solids to a mechanical part with positive and negative offset amounts, respectively.

Figure 2:
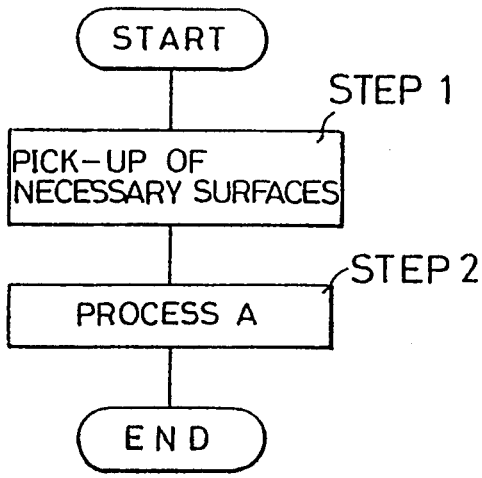
FIG. 2 is a flowchart to illustrate another embodiment of offset surface production method according to the present invention.

FIG. 2 is a flowchart to explain another embodiment of an offset curved surface production method according to the present invention. Steps of the method are explained in the following.

Step 1: Selection of necessary surfaces.

Step 2: Process A in FIG. 1, which are Steps 1–4 in the first embodiment.

An offset surface of wide range may be produced to an assembly of surfaces selected from a part of solid accordingly.

Figures 11A, 11B:
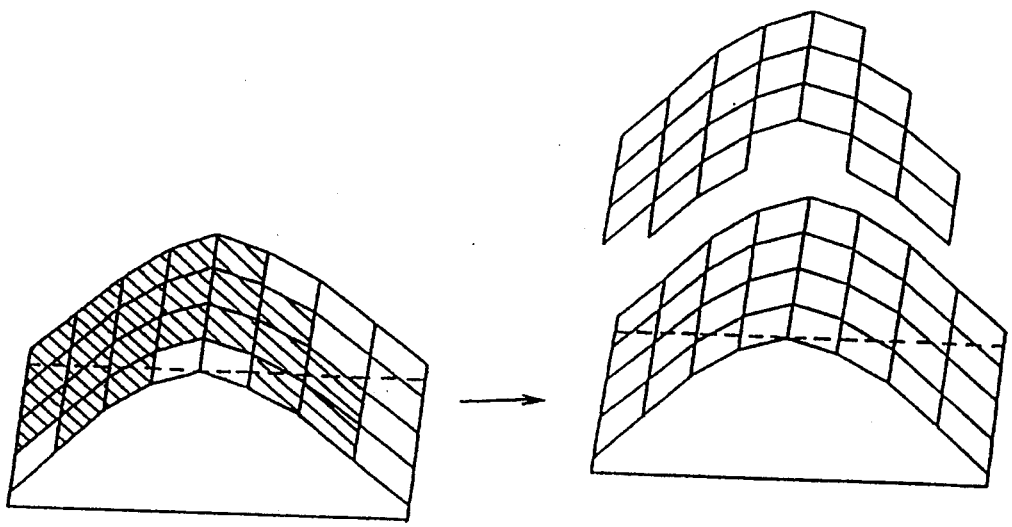
FIGS. 11a and 11b are drawings to show an example of offset of surface set.

FIGS. 11a and 11b are drawings to show a specific example of curved surface production using the offset curved surface production method as shown in FIG. 2. FIG. 11a shows surfaces (hatched portions) selected from a part of solid, and FIG. 11b the offset surface obtained in a wide range.

Figure 3:
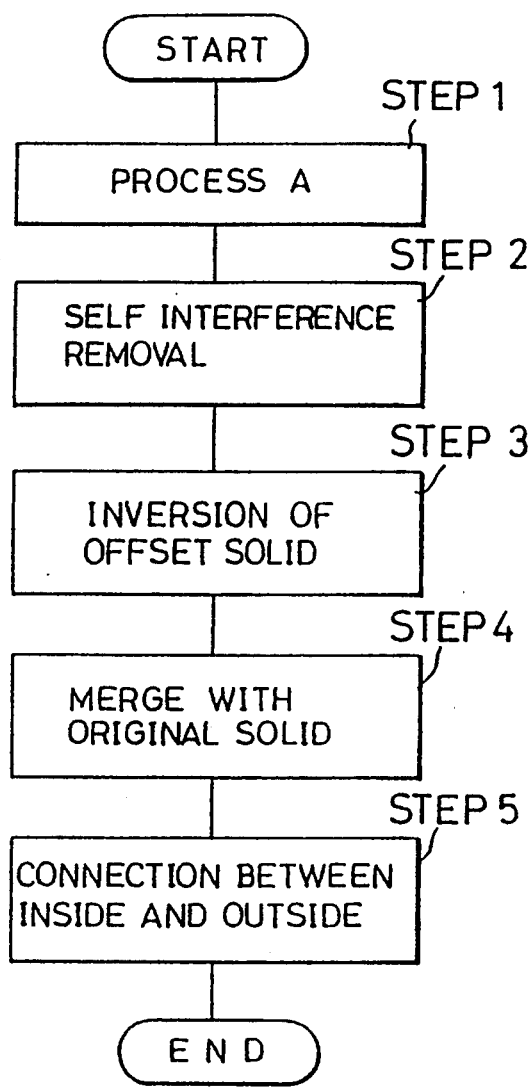
FIG. 3 is a flowchart to illustrate still another embodiment of the offset solid production method according to the present invention.

FIG. 3 is a flowchart to explain still another embodiment of the offset solid production method according to the present invention. Steps of the embodiment are explained in the following.

Step 1: Process A in FIG. 1, which are Steps 1–4 in the first embodiment.

Step 2: Removal of self interference portions.

Step 3: Inversion of offset solid. An offset solid is inverted inside out to obtain a hollow solid with a sectional thickness while inverting topology information.

Step 4: The thus-inverted offset solid is merged with an original solid. In other words, the original solid is made together with the offset solid.

Step 5: Connection between the outside and the inside of the solids combined in Step 4 to obtain a hollow solid with a predetermined thickness.

Thus combining the produced offset solid with the original solid, a solid may be produced with an identical thickness.

Figure 12A:
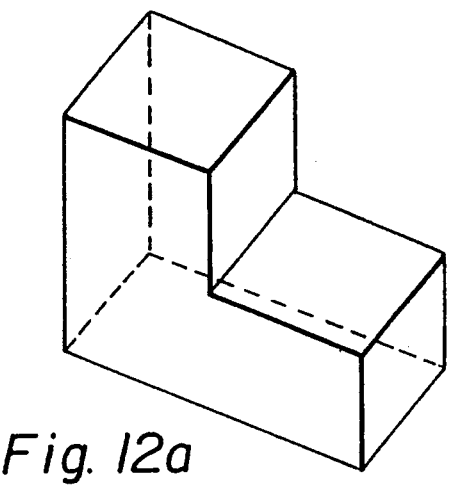
FIGS. 12a to 12d show an original solid, an offset solid, an inverted offset solid, and a hollow solid with a predetermined thickness, respectively, to explain how to produce the hollow solid.
Figure 12B:
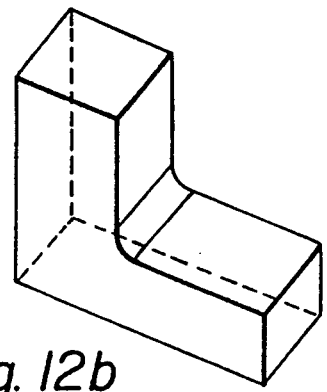
Figure 12C:
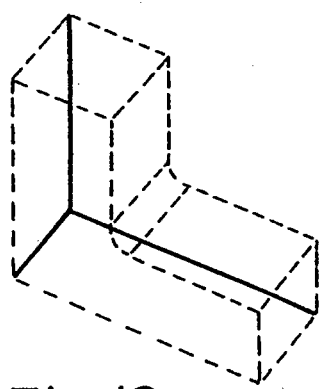
Figure 12D:
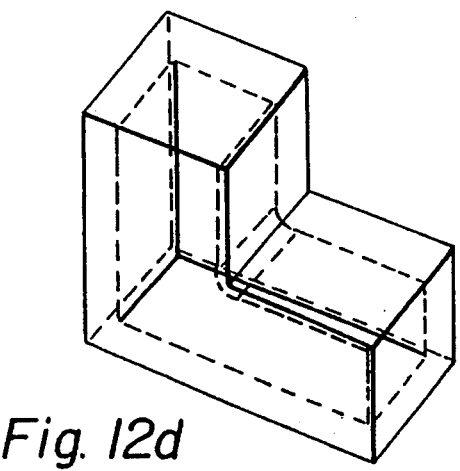

FIGS. 12a to 12b are drawings to show a specific example of hollow solid production using the offset solid production method as shown in FIG. 3. FIG. 12a shows an original solid, while FIG. 12b shows an offset solid based on the original solid, offset on the inside by a designated offset amount using the aforementioned method. FIG. 12c shows an offset solid turned inside out based on that depicted in FIG. 12b. In FIGS. 12b and 12c, the edges depicted as solid lines are represented as seen from outside, while the edges depicted as dotted lines are represented as seen from inside. The edges depicted as solid lines in FIG. 12b are depicted as dotted lines in FIG. 12c, and vice versa, because of inverting topology information. FIG. 12d shows a hollow solid with the predetermined thickness produced by merging the original solid and the inverted offset solid. This is the specific example to produce a solid with a thickness of identical designated offset amount, which is hollowed inside the solid with respect to designated planes.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for producing a plurality of offset surfaces from a plurality of connected original surfaces, the method comprising:

judging a connection condition between two adjacent original surfaces as to whether the connection condition is smooth, concave or convex, based on an angle between two vector products of vectors selected from three tangent vectors of edges joining at a vertex, one of which is the tangent vector of the edge at which the two adjacent original surfaces meet;

forming an offset surface by offsetting each of the original surfaces at a predetermined distance along unit vectors normal to the original surface;

forming an offset loop by offsetting an original loop for each of the original surfaces at the predetermined distance along unit vectors normal to the original surface at its edges;

producing a new surface between two adjacent offset loops for an interpolation of the new surface when the connection condition is convex;

producing a new surface in a new gap made after the interpolation between offset loops; and removing a self interference portion when the connection condition is concave.

2. The method of claim 1, wherein:
the original surfaces are completely closed and represent a solid.

3. The method of claim 1, comprising:

multiplying (1) the tangent vector of the edge at which the two original surfaces meet and (2) each of the remaining two vectors, to obtain the vector products.

4. The method of claim 1, comprising:

taking several points on edges constituting an original loop;

obtaining offset points by offsetting the several points at the predetermined distance along unit vectors normal to the original surface at its edges; and obtaining an offset loop from offset points and direction vectors at the respective offset points.

5. A method for producing a plurality of offset surfaces from a plurality of connected original surfaces, the method comprising:

judging a connection condition between two adjacent original surfaces as to whether the connection condition is smooth, concave or convex, based on an angle between two vectors normal to the original surfaces at a point of the edge at which the two adjacent original surfaces meet;

forming an offset surface by offsetting each of the original surfaces at a predetermined distance along unit vectors normal to the original surface;

forming an offset loop by offsetting an original loop for each of the original surfaces at the predetermined distance along unit vectors normal to the original surface at its edges;

producing a new surface between two adjacent offset loops for an interpolation and connection of the new surface when the connection condition is convex;

producing a new surface in a new gap made after the interpolation between offset loops; and removing a self interference portion when the connection condition is concave.

6. The method of claim 5, wherein:
the original surfaces are completely closed and represent a solid.

7. The method of claim 5, comprising:

taking several points on edges constituting an original loop;

obtaining offset points by offsetting the several points at the predetermined distance along unit vectors normal to the original surface at its edges; and obtaining an offset loop from offset points and direction vectors at the respective offset points.

8. A method for producing a plurality of offset surfaces from part of a plurality of original connected surfaces, the method comprising:

judging a connection condition between two adjacent original surfaces belonging to the part of the plurality of original connected surfaces, as to whether the connection condition is smooth, concave or convex, based on an angle between two vector products of vectors selected from three tangent vectors of edges joining at a vertex, one being the tangent vector of the edge at which the two adjacent original surfaces meet and multiplied by each of the remaining two tangent vectors;

forming an offset surface by offsetting each of the original surfaces at a predetermined distance along unit vectors normal to the original surface;

forming an offset loop by offsetting an original loop for each of the original surfaces at the predetermined distance along unit vectors normal to the original surface at its edges;

producing a new surface between two adjacent offset loops for an interpolation of the new surface when the connection condition is convex;

producing a new surface in a new gap made after the interpolation between offset loops; and removing a self interference portion when the connection condition is concave.

9. The method of claim 8, comprising:

taking several points on edges constituting an original loop;

obtaining offset points by offsetting the several points at the predetermined distance along unit vectors normal to the original surface at its edges; and obtaining an offset loop from offset points and direction vectors at the respective offset points.

10. A method for producing a plurality of offset surfaces from a part of a plurality of original surfaces connected, the method comprising:

judging a connection condition between adjacent original surfaces belonging to the part of the plurality of original surfaces connected, as to whether the connection condition is smooth, concave or convex, based on an angle between two normal vectors to the original surfaces at a point of the edge at which the two adjacent original surfaces meet;

forming an offset surface by offsetting each of the original surfaces at a predetermined distance along unit vectors normal to the original surface;

forming an offset loop by offsetting an original loop for each of the original surfaces at the predetermined distance along unit vectors normal to the original surface at its edges;

producing a new surface between two adjacent offset loops for an interpolation of the new surface when the connection condition is convex;

producing a new surface in a new gap made after the interpolation between offset loops; and removing a self interference portion when the connection condition is concave.

11. The method of claim 10, comprising:

taking several points on edges constituting an original loop;

obtaining offset points by offsetting the several points at the predetermined distance along unit vectors normal to the original surface at its edges; and obtaining an offset loop from offset points and direction vectors at the respective offset points.

12. A method for producing a hollow solid with a predetermined thickness, the method comprising:

judging a connection condition between two adjacent surfaces of a plurality of original surfaces that are completely closed as an original solid, as to whether the connection condition is smooth, concave or convex, based on an angle between two vector products of vectors selected from three tangent vectors of edges joining at a vertex, one being the tangent vector of the edge at which the two adjacent original surfaces meet;

forming an offset surface by offsetting each of the original surfaces at a predetermined distance along unit vectors normal to the original surface;

forming an offset loop by offsetting an original loop for each of the original surfaces at the predetermined distance along unit vectors normal to the original surface at its edges;

producing a new surface between two adjacent offset loops for interpolation of the new surface when the connection condition is convex;

removing a self interference portion when the connection condition is concave to obtain an offset solid;

turning the offset solid inside out to obtain an inverted offset solid; and merging the original solid and the inverted offset solid to obtain the hollow solid.

13. The method of claim 12, comprising:

multiplying (1) the tangent vector of the edge at which the two original surfaces meet and (2) each of the remaining two vectors, to obtain the vector products.

14. The method of claim 12, comprising:

taking several points on edges constituting an original loop;

obtaining offset points by offsetting the several points at the predetermined distance along unit vectors normal to the original surface at its edges; and obtaining an offset loop from offset points and direction vectors at the respective offset points.

15. A method for producing a hollow solid with a predetermined thickness, the method comprising:

judging a connection condition between two adjacent original surfaces of a plurality of original surfaces that are completely closed as an original solid, as to whether the connection condition is smooth, concave or convex, based on an angle between two normal vectors to the original surfaces at a point of the edge at which the two adjacent original surfaces meet;

forming an offset surface by offsetting each of original surfaces at a predetermined distance along unit vectors normal to the original surface;

forming an offset loop by offsetting an original loop for each of the original surfaces at the predetermined distance along unit vectors normal to the original surface at its edges;

producing a new surface between two adjacent offset loops for interpolation of the new surface when the connection condition is convex;

removing a self interference portion when the connection condition is concave to obtain an offset solid;

inverting the offset solid inside out to obtain an inverted offset solid; and merging the original solid and the inverted offset solid to obtain the hollow solid.

16. The method of claim 15, comprising:

taking several points on edges constituting an original loop;

obtaining offset points by offsetting the several points at the predetermined distance along unit vectors normal to the original surface at its edges; and obtaining an offset loop from offset points and direction vectors at the respective offset points.

* * * * *